US012681280B1

(12) United States Patent
Howe

(10) Patent No.: US 12,681,280 B1
(45) Date of Patent: Jul. 14, 2026

(54) DUAL BEAM PATH OPTICAL ARRANGEMENTS

(71) Applicant: Eagle Technology, LLC, Melbourne, FL (US)

(72) Inventor: Russell Howe, Wilmington, MA (US)

(73) Assignee: Eagle Technology, LLC, Melbourne, FL (US)

( * ) Notice: Subject to any disclaimer, the term of this patent is extended or adjusted under 35 U.S.C. 154(b) by 388 days.

(21) Appl. No.: 18/479,434

(22) Filed: Oct. 2, 2023

(51) Int. Cl.
*G02B 17/06* (2006.01)

(52) U.S. Cl.
CPC ................................. *G02B 17/0642* (2013.01)

(58) Field of Classification Search
None
See application file for complete search history.

(56) References Cited

U.S. PATENT DOCUMENTS

| | | | |
|---|---|---|---|
| 4,812,030 A * | 3/1989 | Pinson | G02B 17/0694 359/877 |
| 4,964,706 A | 10/1990 | Cook | |
| 5,144,496 A * | 9/1992 | Kashima | G02B 17/0631 359/861 |
| 5,227,923 A | 7/1993 | Kebo | |
| 6,965,351 B1 * | 11/2005 | Miller | H01Q 1/288 343/781 CA |
| 8,094,081 B1 | 1/2012 | Bruzzi et al. | |
| 8,139,289 B2 | 3/2012 | Comstock, II et al. | |
| 8,947,778 B2 | 2/2015 | Horton | |
| 10,095,015 B2 | 10/2018 | Chiarini et al. | |
| 11,489,259 B2 | 11/2022 | Mitchelson et al. | |
| 2011/0017269 A1 * | 1/2011 | Fangman | F24S 23/80 136/246 |
| 2021/0382289 A1 | 12/2021 | Li et al. | |
| 2022/0244519 A1 | 8/2022 | Parry | |
| 2022/0299756 A1 | 9/2022 | Rogala et al. | |

OTHER PUBLICATIONS

J. Michael Rodgers, "Four-mirror compact afocal telescope with dual exit pupil," in International Optical Design, Technical Digest (CD) (Optica Publishing Group, 2006), paper WC1, https://opg.optica.org/abstract.cfm?URI=IODC-2006-WC1, 7 pages.
Olmi, L., "The Optical Design of Relay Optics for Heterodyne Millimeter Wave Focal Plane Arrays", International Journal of Infrared and Millimeter Waves, vol. 21, ,No. 3, (2000), https://doi.org/10.1023/A:1006650929571, 29 pages.
David Shafer, "Optical Design With Only Two Surfaces", Proc. SPIE 0237, 1980 International Lens Design Conference, (Sep. 16, 1980); https://doi.org/10.1117/12.959092, 7 pages.
Yingxi Zuo, et al., "Optical Design Considerations for a Millimeter-Wave Focal Plane Array", Conference Paper, May 2008, DOI: 10.1109/GSMM.2008.4534597, 5 pages.

* cited by examiner

*Primary Examiner* — Robert E. Tallman
(74) *Attorney, Agent, or Firm* — Edell, Shapiro & Finnan, LLC

(57) ABSTRACT

The techniques described herein relate to an apparatus including: a primary reflector including an orifice and a first reflective surface, the first reflective surface including a first region and a second region; and a secondary reflector including a second reflective surface facing the first reflective surface; wherein the first region, the second regions and the second reflective surface are configured such that the apparatus provides a two-bounce beam path through the apparatus and an independent four-bounce beam path through the apparatus.

20 Claims, 6 Drawing Sheets

DUAL BEAM PATH OPTICAL ARRANGEMENTS

TECHNICAL FIELD

The present disclosure relates to optical devices, such as Cassegrain reflectors.

BACKGROUND

A Cassegrain reflector is a type of telescope or optical system initially used in astronomy. It is named after its inventor, Laurent Cassegrain, who designed it in the mid-17th century. This type of reflector combines two mirrors to gather and focus light, resulting in a compact and versatile optical design.

The basic structure of a Cassegrain reflector consists of a primary mirror, a secondary mirror, and a focus point, which would be the location of the eyepiece focus or camera sensor in a telescope embodiment. The primary mirror is typically a concave parabolic mirror, while the secondary mirror is generally a smaller convex hyperbolic mirror. The primary mirror collects incoming light and reflects it to the secondary mirror, which, in turn, reflects the light back through a hole in the primary mirror to the focus point.

The secondary mirror is usually mounted near the center of the primary mirror, and it intercepts the light path coming from the primary mirror. By reflecting the light back through the central hole in the primary mirror, the Cassegrain design allows for a longer focal length in a shorter overall physical length of the optical system.

The primary advantage of a Cassegrain reflector is its ability to produce a long focal length in a relatively small volume, resulting in high magnification. The secondary mirror redirects the light, which allows for a more convenient placement of the eyepiece or camera at the back of the telescope. In certain embodiments, Cassegrain reflectors may reduce the chance of image degradation caused by dust or debris on the secondary mirror.

Cassegrain reflectors come in various sizes, ranging from small portable models to large professional observatory-grade telescopes. They are used for a wide range of astronomical observations, including planetary viewing, deep space imaging, and astrophotography. Due to their compact design and versatility, Cassegrain reflectors are popular for a wide range of optical use cases.

DETAILED DESCRIPTION

Overview

Figures 1A, 1B, 1C:
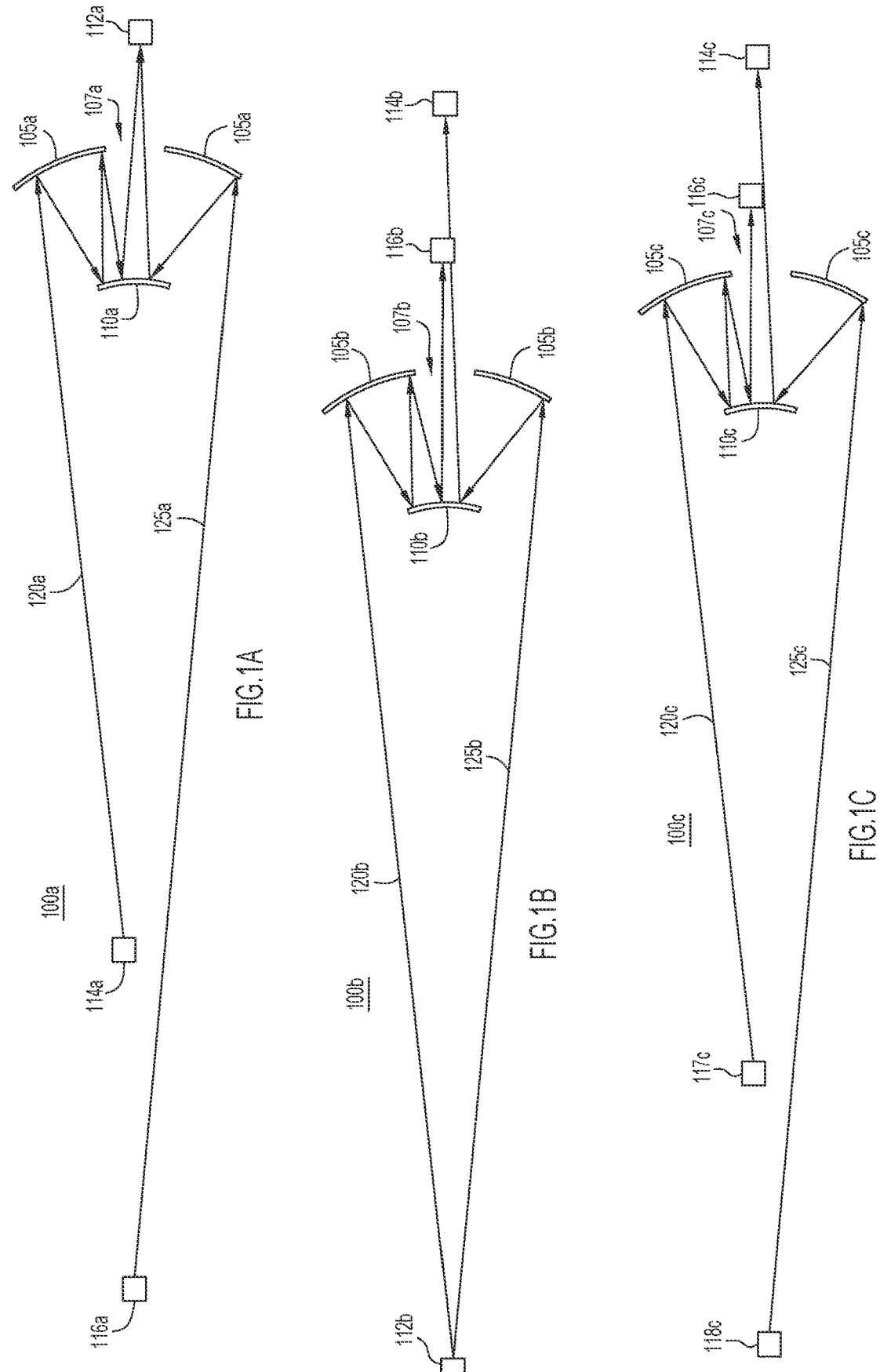
FIG. 1A is a first Cassegrain reflector configured according to the dual beam path techniques of this disclosure.
FIG. 1B is a second Cassegrain reflector configured according to the disclosed dual beam path techniques.
FIG. 1C is a third Cassegrain reflector configured according to the disclosed dual beam path techniques.

In some aspects, the techniques described herein relate to an apparatus including: a primary reflector including an orifice and a first reflective surface, the first reflective surface including a first region and a second region; and a secondary reflector including a second reflective surface facing the first reflective surface; wherein the first region and the second reflective surface are configured such that the apparatus provides a first beam path in which light of the first beam path reflects off the first region to the second reflective surface, and reflects off the second reflective surface through the orifice, and wherein the first region, the second region and the second reflective surface are configured such that the apparatus provides a second beam path in which light of the second beam path reflects off the first region to the second reflective surface, reflects of the second reflective surface onto the second region, reflects off the second region to the second reflective surface, and reflects off the second reflective surface through the orifice.

In some aspects, the techniques described herein relate to an apparatus including: a primary reflector including a first orifice and a first reflective surface; a secondary reflector including a second reflective surface facing the first reflective surface; and a third reflector including a second orifice and a third reflective surface facing the second reflective surface; wherein the primary reflector, secondary reflector and third reflector are configured such that the apparatus provides a first beam path in which light of the first beam path reflects off the first reflective surface to the second reflective surface and reflects off the second reflective surface through the first orifice and the second orifice, and wherein the primary reflector, the secondary reflector and the third reflector are configured such that the apparatus provides a second beam path in which light of the second beam path reflects off the first reflective surface to the second reflective surface, reflects off the second reflective surface to the third reflective surface, reflects off the third reflective surface to the second reflective surface, and reflects off the second reflective surface through the second orifice and the first orifice.

In some aspects, the techniques described herein relate to an apparatus including: a primary reflector including a first orifice and a first reflective surface; a secondary reflector including a second reflective surface facing the first reflective surface; a third reflector including a second orifice and a third reflective surface facing the second reflective surface; and a fourth reflector including a fourth reflective surface facing the third reflective surface; wherein the primary reflector, secondary reflector and third reflector are configured such that the apparatus provides a first beam path in which light of the first beam path reflects off the first reflective surface, to the second reflective surface and reflects off the second reflective surface through the first orifice and the second orifice, and wherein the primary reflector, the secondary reflector, the third reflector and the fourth reflector are configured such that the apparatus provides a second beam path in which light of the second beam path reflects off the first reflective surface to the second reflective surface, reflects off the second reflective surface to the third reflective surface, reflects off the third reflective surface to the fourth reflective surface, and reflects off the fourth reflective surface through the second orifice and the first orifice.

EXAMPLE EMBODIMENTS

With reference now made to FIGS. 1A, 1B and 1C, depicted therein are three example Cassegrain reflectors 100a, 100b and 100c, respectively, configured according to the techniques of this disclosure. Beginning with Cassegrain reflector 100a of FIG. 1A, the reflector 100a includes a primary reflector, primary mirror 105a, and a secondary reflector, secondary mirror 110a. Primary mirror 105a includes an orifice 107a and a reflective surface. The reflective surface of primary mirror 105a is opposite the reflective surface of the secondary mirror 110a. Furthermore, the reflective surface of primary mirror 105a and secondary mirror 110a are configured to provide for two independent beam paths through Cassegrain reflector 100a—path 120a and path 125a. Path 120a follows a "four-bounce" path between primary mirror 105a and secondary mirror 110a while path 125a follows a traditional "two-bounce" path between primary mirror 105a and secondary mirror 110a.

In the two-bounce path 120a, light is first reflected off of the reflective surface of the primary mirror 105a towards the reflective surface of the secondary mirror 110a. Secondary mirror 110a then reflects the light through orifice 107a towards focus point 112a. "Light," as used herein, refers to electromagnetic radiation of any suitable wavelength, not just visible light.

In the four-bounce path 125a, light first reflects off of the reflective surface of the primary mirror 105a toward the reflective surface of the secondary mirror 110a. Secondary mirror 110a then reflects the light for a second time back towards primary mirror 105a. Primary mirror 105a reflects the light for a third time back towards secondary mirror 110a where it is reflected for a fourth time through orifice 107a towards focus point 112a.

As described above, Cassegrain reflector 100a includes a focus point 112a for both first path 120a and second path 125a that is closest to secondary mirror 110a along the beam paths. Cassegrain reflector 100a also includes conjugate focus points 114a and 116b which are closest to primary mirror 105a along optical paths 120a and 125a, respectively. An arrangement like that of FIG. 1A may allow for a detector or sensor (e.g., a camera, a charged-coupled device (CCD), a complementary metal-oxide semiconductor (CMOS) sensor, etc.) arranged at focus point 112a to receive data from two different sources arranged at focus points 114a and 116a, respectively. Alternatively, the arrangement of FIG. 1A may be used to project light from a single source arranged at focus point 112a to two different locations, arranged at focus points 114a and 116a, respectively.

Cassegrain reflector 100b of FIG. 1B is similar to Cassegrain reflector 100a in that it includes a primary mirror 105b, an orifice 107b, a secondary mirror 110b, an orifice 107b, a single focus point 112b, and conjugate focus points 114b and 116b. However, unlike Cassegrain reflector 100a, the single focus point 112b of Cassegrain reflector 100b is before the primary mirror 105b along paths 120b and 125b, while conjugate focus points 114b and 116b are following the secondary mirror 110b along paths 120b and 125b, respectively. Accordingly, the arrangement of FIG. 1B may be used to provide image data from the same source, located at focus point 112b, to two different detectors or sensors arranged at focus points 114b and 116b, respectively. Alternatively, the arrangement of FIG. 1B may be used to project light from two different sources arranged at focus points 114b and 116b, respectively, to the same location, arranged at focus point 112b. Like path 120a of Cassegrain reflector 100a, path 120b is a four-bounce path, and like path 125a of Cassegrain reflector 100a, path 125b is a two-bounce path.

Cassegrain reflector 100c is similar to Cassegrain reflectors 100a and 100b in that it also includes a primary mirror 105c, an orifice 107c and a secondary mirror 110c. However, unlike Cassegrain reflectors 100a and 100b, Cassegrain reflector 100c includes two focus points 114c and 116c following the secondary mirror 110c and two focus points 117c and 118c before the primary mirror 105c. Accordingly, the arrangement of FIG. 1C may be used so reuse optical elements 105c and 110c for what are essentially two distinct optical systems—a first system between focus point 114c and focus point 118c and a second system between focus point 116c and 117c. Like path 120a of Cassegrain reflector 100a, path 120c is a four-bounce path, and like path 125a of Cassegrain reflector 100a, path 125c is a two-bounce path.

As illustrated in FIGS. 1A, 1B and 1C, the techniques disclosed herein provide for two different object locations (e.g., focus points 114a and 116a of FIG. 1A, focus points 114b and 116b of FIG. 1B, and focus points 114c and 116c or 117c and 118c of FIG. 1C) without any additional optical elements being introduced to a Cassegrain system. As will be described in greater detail below, the disclosed techniques may include modifying a portion of the optical surface of one of the primary mirror 105a/105b/105c and/or secondary mirror 110a/110b/110c of the Cassegrain reflector, which provide the additional object location without adding weight or alignment complexity to the optical system. According to other examples, such as those described below with reference to FIGS. 6 and 7, additional optics may be included, providing the additional object location without increasing the size of the Cassegrain reflector. Accordingly, embodiments of the techniques of this disclosure may provide for:

Multiple conjugate behavior;

Imaging performance at both conjugates; and

Simplified path/field of view (FOV) separation schemes

As indicated in FIGS. 1A and 1C, the four-bounce path 120a/120c may be used for shorter focal length conjugate locations compared with the two-bounce path 125a/125c. For example, focus points 116b and 117c, associated with four-bounce paths 120b and 120c, respectively, may use a shorter focal length than focus points 116a and 118c, associated with two-bounce paths 125a and 125c, respectively. Furthermore, while two-bounce paths 125a and 125c are illustrated as having forward focus points 116a and 118c, respectively, the skilled artisan will understand that two-bounce paths 125a and 125c may be embodied as collimated beam paths with a functionally infinitely-distant focus point, as with path 125b of FIG. 1B.

Figures 2, 3:
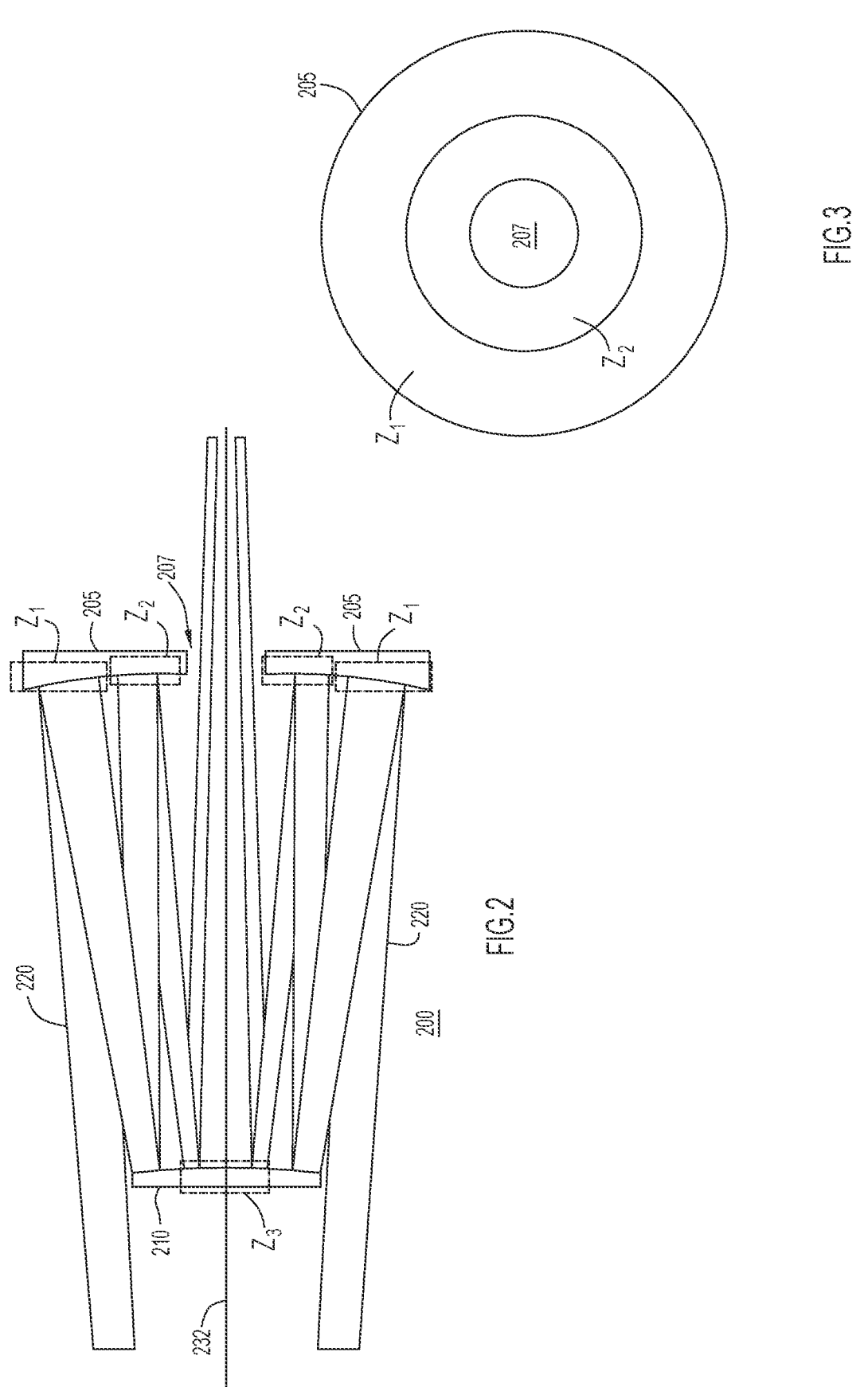
FIG. 2 is a detailed view of a four-bounce beam path through a first example Cassegrain reflector configured to implement the disclosed dual beam path techniques.
FIG. 3 is a detailed illustration of the primary reflector of the first example Cassegrain reflector configured to implement the disclosed dual beam path techniques.
Figure 4:
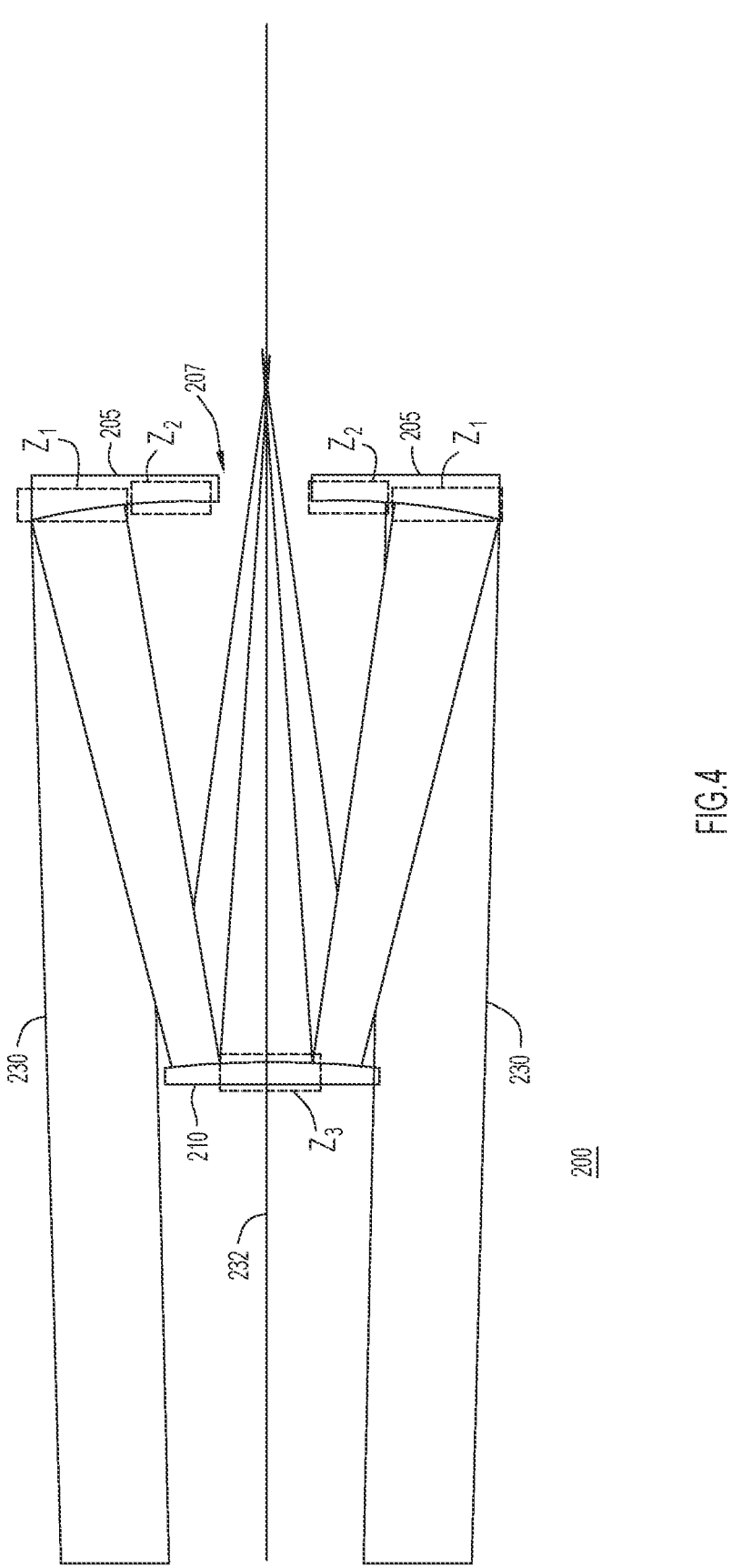
FIG. 4 is a detailed view of a two-bounce beam path through the first example Cassegrain reflector configured to implement the disclosed dual beam path techniques.

A more detailed illustration of a four-bounce optical path provided by a Cassegrain reflector configured according to the disclosed techniques is illustrated in FIG. 2, the structure of a Cassegrain reflector primary mirror configured according to the disclosed techniques is illustrated in FIG. 3, and a two-bounce path through the Cassegrain reflector is illustrated in detail in FIG. 4.

Turning to FIG. 2, beam path 220 follows a four-bounce path between primary mirror 205 and secondary mirror 210.

Assuming the source of the radiation in beam path 220 is to the right of Cassegrain reflector 200, the radiation of beam path 220 is initially incident on primary mirror 205 in region $Z_1$, which as illustrated in the example primary mirror 205 of FIG. 3 is an annular region around the radial exterior of primary mirror 205. The light incident in region $Z_1$ is reflected by primary mirror 205 towards secondary mirror 210. In a traditional 2-bounce path, the radiation incident on secondary mirror 210 would be reflected by secondary mirror 210 though orifice 207 towards the focus point, such as focus point 112a of FIG. 1A or focus point 114b of FIG. 1B. However, according to the disclosed techniques, primary mirror 205 and secondary mirror 210 are configured such that the light reflected off of secondary mirror 210 reflects back onto primary mirror 205 into region $Z_2$, which is an annular region around the orifice 207 of primary mirror 205, as illustrated in FIG. 3. The radiation incident on primary mirror 205 in region $Z_2$ is reflected back towards secondary mirror 210, which reflects the incident radiation through orifice 207 towards a focus point, such as focus point 112a of FIG. 1A or focus point 116b of FIG. 1B. The second time the radiation is incident on secondary mirror 210 it is incident in region $Z_3$.

Radiation incident on Cassegrain reflector 200 in the opposite direction, i.e., radiation entering Cassegrain reflector 200 from the left side of FIG. 2, may follow a similarly 4-bounce path. However, the radiation will follow the reverse path from that discussed above.

In order to ensure that the light reflected back onto region $Z_2$ results in a four bounce path, $Z_2$ may be configured with different optical properties than region $Z_1$. For example, region $Z_2$ may be provided with a different profile than region $Z_1$ such that light reflected from region $Z_2$ reflects to a different focus than that reflected from region $Z_1$. Specifically, region $Z_1$ and region $Z_2$ may be provided with different optical prescriptions. According to other examples, primary mirror 205 may be constructed as a faceted mirror, with region $Z_1$ comprising a first facet and region $Z_2$ comprising a second facet, with the first and second facets being provided at different angles with respect to the optical axis 232. According to other examples, regions $Z_1$ and $Z_2$ may be provided with different coatings or surface structures which result in light reflecting off of region $Z_2$ at a different angle than region $Z_1$. For example, region $Z_1$ may be configured with a first Bragg reflector layer structure and region $Z_2$ may be provided with second Bragg reflector layer structure which results in light reflecting off of region $Z_2$ at a different angle than region $Z_1$. According to still other examples, regions $Z_1$ and $Z_2$ may be provided with different microstructured surfaces such that light reflects off of region $Z_2$ at a different angle than region $Z_1$.

In other examples, region $Z_3$ of secondary mirror 210 may be configured to implement four-bounce path 220. For example, region $Z_3$ may be provided with a different optical prescription (e.g., conic constant, asphericity, contour, radius of curvature), facet, coating or microstructure than the remainder of secondary mirror 210. Alternatively, the structure of region $Z_3$ may be configured to adjust the light reflected within beam path 220 to provide, for example, alternate field aberration correction or image displacement.

Turning to FIG. 4, by comparing the two-bounce beam path 230 through Cassegrain reflector 200 illustrated therein with the four-bounce beam path 220 of FIG. 2, it may be seen how the changes to regions $Z_2$ and $Z_3$ do not affect the traditional two bounce path. Specifically, two-bounce beam path 230 is incident on primary mirror 205 only within region $Z_1$ and is only incident on secondary mirror 210 outside of region $Z_3$. For example, region $Z_2$ may be in the shadow of secondary mirror 210 along beam path 230. Accordingly, beam path 230 will not be incident in region $Z_2$.

Figure 5:
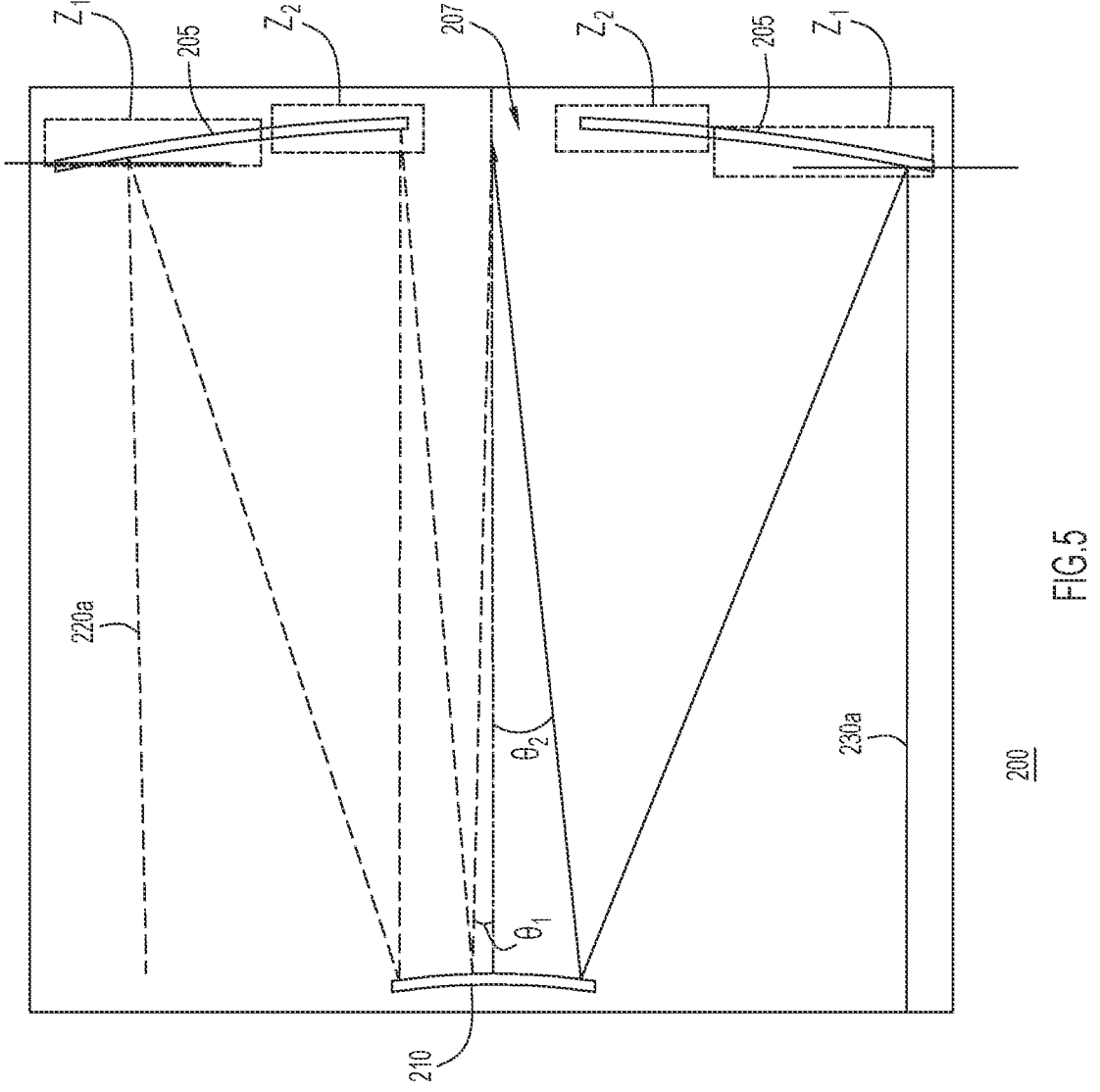
FIG. 5 illustrates the different numerical apertures associated with the four-bounce beam path and the two-bounce beam path of the first example Cassegrain reflector configured to implement the disclosed dual beam path techniques.

According to the disclosed techniques, the path radiation follows through Cassegrain reflectors 100a/100b/200 may be dependent on the angle at which the radiation enters the Cassegrain reflector, as will now be described reference to Cassegrain reflector 200 as illustrated in FIG. 5. Specifically, illustrated in FIG. 5 are a single ray 220a (illustrated with a dashed line) from the four-bounce beam path 220 illustrated in FIG. 2 and a single ray 230a (illustrated with a solid line) from the two-bounce beam path 230 illustrated FIG. 4. The angle θ1 indicates the angle at which ray 220a is incident on secondary mirror 210 measured from the focal point to the right of orifice 207. Ray 230a is incident at an analogous angle $\theta_2$. According to the example of FIG. 5, $\theta_1$ is smaller than $\theta_2$. This difference is illustrative of the different numerical apertures for the four- and two-bounce beam paths through Cassegrain reflector 200. As understood by the skilled artisan, the numerical aperture is a dimensionless number that characterizes the range of angles over which the system can accept or emit light. Accordingly, the numerical aperture for the two-bounce path 220 differs from that of the numerical aperture for the four-bounce beam path 230 with region $Z_2$ being configured such that light that would not be accepted (i.e., not focused) in a traditional Cassegrain reflector is accepted and focused using the four-bounce beam path of the disclosed techniques. As understood by the skilled artisan, accordingly, the light of two-bounce beam path 220 may initiate from the focus point on either side of reflector 200, i.e., as understood by the skilled artisan, the optical system of FIG. 5 is reversible).

The examples of the disclosed techniques described above with reference to FIGS. 1A-C and 2-5 implement the four-bounce beam path of the Cassegrain reflector utilizing a primary mirror in which an inner region of the primary mirror (e.g., region $Z_2$ of FIGS. 1A-C, and 2-4) is configured differently than an outer region (e.g., region $Z_1$ of FIGS. 1A-C and 2-4). However, the disclosed techniques may be implemented using different optical structures, such as those illustrated in FIG. 7.

Figure 6:
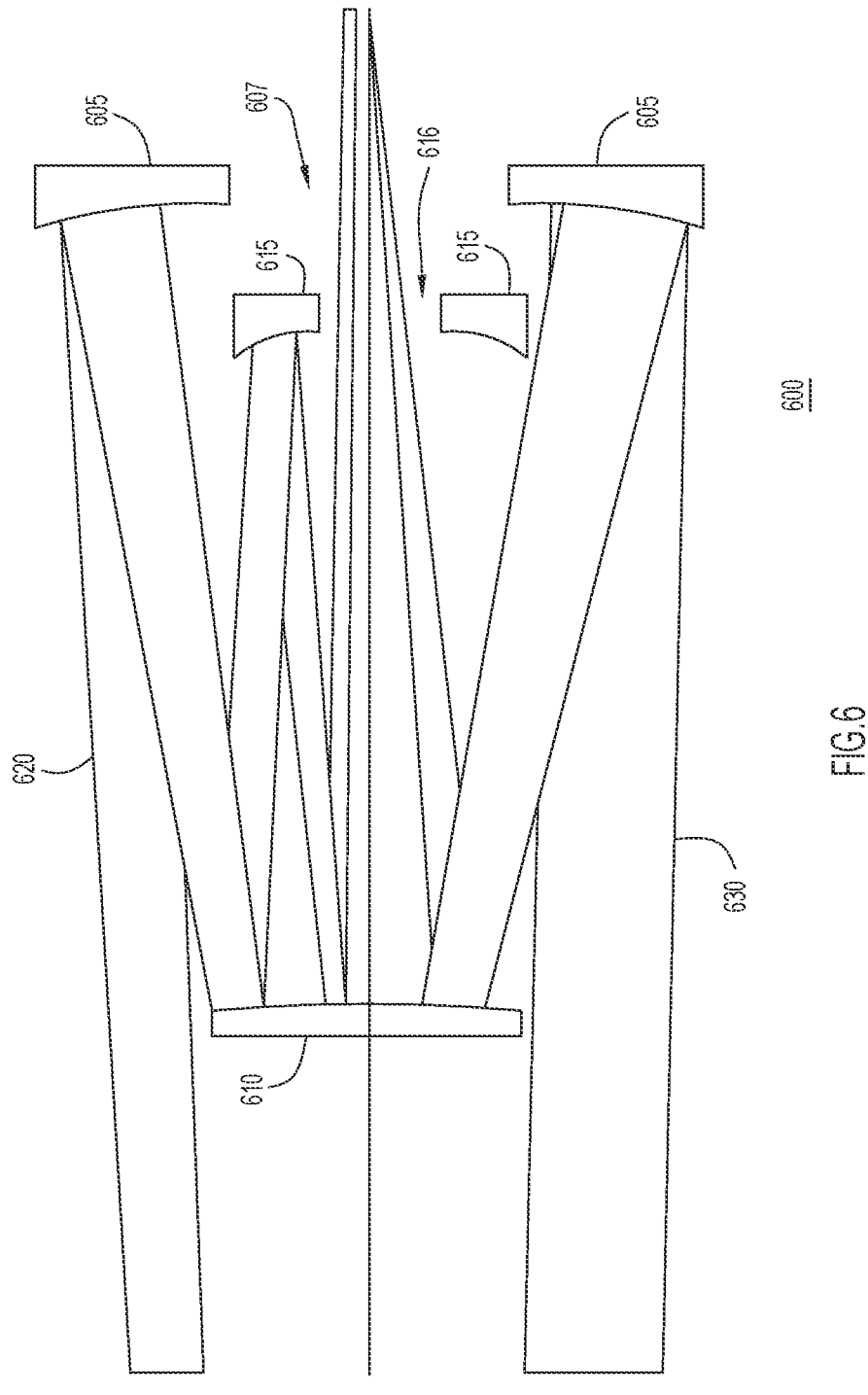
FIG. 6 is an illustration of a four-bounce beam path and a two-bounce beam path of a second optical arrangement configured to implement the disclosed dual beam path techniques.

Cassegrain reflector 600 of FIG. 6 provides two-bounce beam path 630 using a primary mirror 605 and a secondary mirror 610, similar to the structures used in traditional Cassegrain reflectors, as well as the Cassegrain reflectors illustrated in FIGS. 1A-C and 2-5. However, to implement four-bounce beam path 620, an additional annular mirror 615 is provided. In the specific example of FIG. 6, annular mirror 615 is arranged between primary mirror 605 and secondary mirror 610. According to other examples, annular mirror 615 may be arranged on the opposite side of primary mirror 605 from secondary mirror 610. According to still other examples, annular mirror 615 may be aligned with primary mirror 605 such that is arranged within orifice 607.

Annular mirror 615 is configured such that it does not interfere with two-bounce beam path 630, with the light of two-bounce beam path 630 reflected from primary mirror 605 passing outside of annular mirror 615, and the light of two-bounce beam path 630 reflected from secondary mirror 610 passing through the orifice 616 formed in annular mirror 615.

For four-bounce beam path 620, on the other hand, annular mirror 615 essentially provides the same function as region $Z_2$ in primary mirrors 105a/105b/105c and 205 of FIGS. 1A-C and 2-5. Accordingly, the light of four-bounce beam path 620 that reflects off of secondary mirror 610 is incident on annular mirror 615 and reflects back towards secondary mirror 610. This light is then reflected off of secondary mirror 610 through orifices 616 and 607, respectively, towards a focus point (not illustrated). It is noted that FIG. 6 has been described under the assumption that light enters Cassegrain reflector 600 from the right hand side of FIG. 6 and exits on the left hand side. The skilled artisan will understand that the optical system of Cassegrain reflector 600 is reversible.

Figure 7:
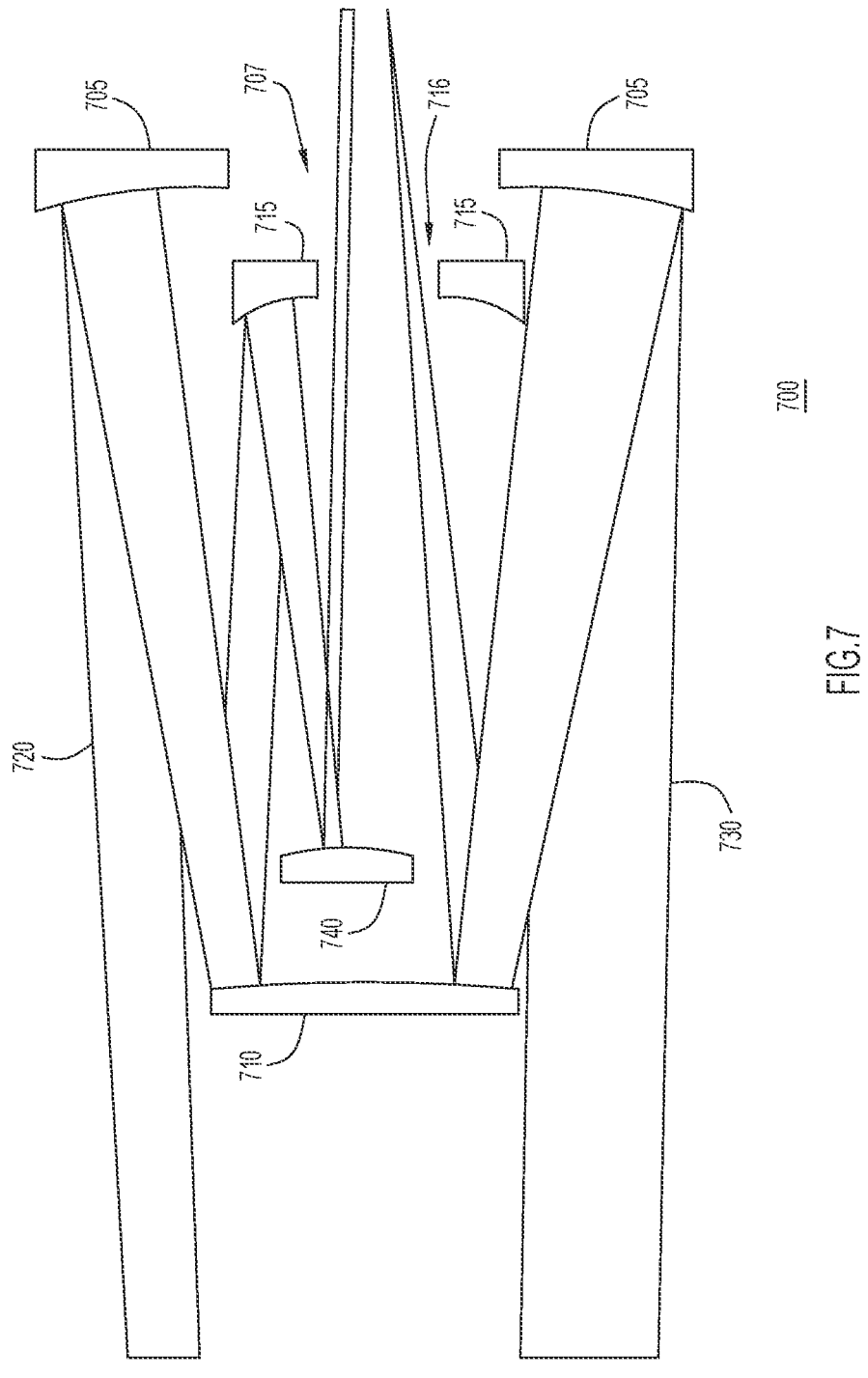
FIG. 7 is an illustration of a four-bounce beam path and a two-bounce beam path of a third example optical arrangement configured to implement the disclosed dual beam path techniques.

Turning to FIG. 7, illustrated therein is another example of the disclosed techniques. Cassegrain reflector 700 of FIG. 7 is similar to Cassegrain reflector 600 of FIG. 6 in that the region $Z_2$ of FIGS. 1A-C and 2-5 has been replaced by an annular mirror 715. Unlike Cassegrain reflector 600 of FIG. 6, Cassegrain reflector 700 utilizes an additional mirror 740 which essentially replaces region $Z_3$ in secondary mirrors 110*a*/110*b*/110*c* and 210 of FIGS. 1A-C and 2-5. Accordingly, the light of four-bounce beam path 720 is initially incident on primary mirror 705, and is reflected onto secondary mirror 710. Secondary mirror 710 reflects the light onto annular mirror 715, which reflects the light onto additional mirror 740. Additional mirror 710 then reflects the light through the orifices 716 and 707, respectively. Two-bounce beam path 730 is essentially unchanged from two-bounce beam path 630 of FIG. 6. Specifically, both annular mirror 715 and additional mirror 740 are arranged within Cassegrain reflector 700 such that they do not interfere with two-bounce beam path 730.

In the example of FIG. 7, additional mirror 740 is arranged between primary mirror 705 and secondary mirror 710. According to other examples, secondary mirror 710 may be configured as an annular mirror with additional mirror 740 being arranged on the opposite side of secondary mirror 710 from the primary mirror 705. Additional mirror 740 may also be arranged within the orifice of an annular embodiment of secondary mirror 710. Additionally, primary mirror 705 and annular mirror 715 may be replaced in Cassegrain reflector 700 with a primary mirror configured like primary mirror 205 of FIG. 2 without deviating from the techniques disclosed herein.

In summary, the techniques disclosed herein may provide for Cassegrain reflectors or telescopes configured to provide high-performance imaging or light collection for two different object locations without any additional optical elements being introduced and/or without increased size of the reflector or telescope. More specifically, the techniques provide for a Cassegrain reflector or telescope that enables an additional imaging path when two sets of reflections are used instead of the common single set. Examples of the disclosed techniques may implement the techniques such that the traditional two-bounce Cassegrain imaging path is not disturbed. Embodiments of the disclosed techniques may also enable new imaging paths that focus to the same image location without adding any new optical elements and/or without increasing the size of the Cassegrain reflector or telescope. Furthermore, implementations of the disclosed techniques may provide the above-described benefits without reducing efficiency of light collection of the original Cassegrain, as diffractive surface applications would. Accordingly, implementing the disclosed techniques may enable dual FOV or dual-channel optical designs with fewer elements than related art techniques.

Therefore, in some aspects, the techniques described herein relate to an apparatus including: a primary reflector including an orifice and a first reflective surface, the first reflective surface including a first region and a second region; and a secondary reflector including a second reflective surface facing the first reflective surface; wherein the first region and the second reflective surface are configured such that the apparatus provides a first beam path in which light of the first beam path reflects off the first region to the second reflective surface, and reflects off the second reflective surface through the orifice, and wherein the first region, the second region and the second reflective surface are configured such that the apparatus provides a second beam path in which light of the second beam path reflects off the first region to the second reflective surface, reflects of the second reflective surface onto the second region, reflects off the second region to the second reflective surface, and reflects off the second reflective surface through the orifice.

In some aspects, the techniques described herein relate to an apparatus, wherein primary reflector includes an annular mirror in which the orifice is at the center of the annular mirror, the second region includes a first annular region closest to the orifice, and the first region includes a second annular region surrounding the first annular region.

In some aspects, the techniques described herein relate to an apparatus, wherein first region includes a first profile and the second region includes a second profile different from the first profile.

In some aspects, the techniques described herein relate to an apparatus, wherein the first region includes a first radius of curvature and the second region includes a second radius of curvature different from the first radius of curvature.

In some aspects, the techniques described herein relate to an apparatus, wherein the first beam path reflects collimated light entering the apparatus such that it initially reflects off of the primary reflector and is reflected off the secondary reflector to a focus point on an opposite side of the primary reflector from the secondary reflector; wherein the second beam path reflects non-collimated light entering the apparatus such that it initially reflects off of the primary reflector and is reflected off the secondary reflector to the focus point.

In some aspects, the techniques described herein relate to an apparatus, wherein the first beam path reflects collimated light entering the apparatus such that it initially reflects off of the primary reflector and is reflected off the secondary reflector to a first focus point on an opposite side of the primary reflector from the secondary reflector; and wherein the second beam path reflects non-collimated light entering the apparatus such that it initially reflects off of the primary reflector and is reflected off the secondary reflector to a second focus point different from the first focus point on the opposite side of the primary reflector from the secondary reflector.

In some aspects, the techniques described herein relate to an apparatus, wherein the first beam path includes a first numerical aperture and the second beam path includes a second numerical aperture different from the first numerical aperture.

In some aspects, the techniques described herein relate to an apparatus including: a primary reflector including a first orifice and a first reflective surface; a secondary reflector including a second reflective surface facing the first reflective surface; and a third reflector including a second orifice and a third reflective surface facing the second reflective surface; wherein the primary reflector, secondary reflector and third reflector are configured such that the apparatus provides a first beam path in which light of the first beam path reflects off the first reflective surface to the second reflective surface and reflects off the second reflective surface through the first orifice and the second orifice, and wherein the primary reflector, the secondary reflector and the third reflector are configured such that the apparatus provides a second beam path in which light of the second beam path reflects off the first reflective surface to the second reflective surface, reflects off the second reflective surface to the third reflective surface, reflects off the third reflective surface to the second reflective surface, and reflects off the second reflective surface through the second orifice and the first orifice.

In some aspects, the techniques described herein relate to an apparatus, wherein primary reflector includes a first annular mirror in which the first orifice is at the center of the first annular mirror, and the third reflector includes a second annular mirror in which the second orifice is at the center of the second annular mirror.

In some aspects, the techniques described herein relate to an apparatus, wherein first reflective surface includes a first profile and the third reflective surface includes a second profile different from the first profile.

In some aspects, the techniques described herein relate to an apparatus, wherein the first reflective surface includes a first radius of curvature and the third reflective surface includes a second radius of curvature different from the first radius of curvature.

In some aspects, the techniques described herein relate to an apparatus, wherein the first beam path reflects collimated light entering the apparatus such that it initially reflects off of the primary reflector and is reflected off the secondary reflector to a focus point on an opposite side of the primary reflector from the secondary reflector; and wherein the second beam path reflects non-collimated light entering the apparatus such that it initially reflects off of the primary reflector and is reflected through the first orifice and the second orifice to the focus point.

In some aspects, the techniques described herein relate to an apparatus, wherein the first beam path reflects collimated light entering the apparatus such that it initially reflects off of the primary reflector and is reflected off the secondary reflector to a first focus point on an opposite side of the primary reflector from the secondary reflector; and Wherein the second beam path reflects non-collimated light entering the apparatus such that it initially reflects off of the primary reflector and is reflected through the first orifice and the second orifice to a second focus point different from the first focus point on the opposite side of the primary reflector from the secondary reflector.

In some aspects, the techniques described herein relate to an apparatus, wherein the third reflector is arranged between the primary reflector and the secondary reflector.

In some aspects, the techniques described herein relate to an apparatus including: a primary reflector including a first orifice and a first reflective surface; a secondary reflector including a second reflective surface facing the first reflective surface; a third reflector including a second orifice and a third reflective surface facing the second reflective surface; and a fourth reflector including a fourth reflective surface facing the third reflective surface; wherein the primary reflector, secondary reflector and third reflector are configured such that the apparatus provides a first beam path in which light of the first beam path reflects off the first reflective surface, to the second reflective surface and reflects off the second reflective surface through the first orifice and the second orifice, and wherein the primary reflector, the secondary reflector, the third reflector and the fourth reflector are configured such that the apparatus provides a second beam path in which light of the second beam path reflects off the first reflective surface to the second reflective surface, reflects off the second reflective surface to the third reflective surface, reflects off the third reflective surface, reflects off the third reflective surface to the fourth reflective surface, and reflects off the fourth reflective surface through the second orifice and the first orifice.

In some aspects, the techniques described herein relate to an apparatus, wherein primary reflector includes a first annular mirror in which the first orifice is at the center of the first annular mirror, and the third reflector includes a second annular mirror in which the second orifice is at the center of the second annular mirror.

In some aspects, the techniques described herein relate to an apparatus, wherein first reflective surface includes a first profile and the third reflective surface includes a second profile different from the first profile.

In some aspects, the techniques described herein relate to an apparatus, wherein the first reflective surface includes a first radius of curvature and the third reflective surface includes a second radius of curvature different from the first radius of curvature.

In some aspects, the techniques described herein relate to an apparatus, wherein the third reflector is arranged between the primary reflector and the secondary reflector.

In some aspects, the techniques described herein relate to an apparatus, wherein the fourth reflector is arranged between the third reflector and the secondary reflector.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An apparatus comprising:
a primary reflector comprising an orifice and a first reflective surface, the first reflective surface comprising a first region and a second region; and
a secondary reflector comprising a second reflective surface facing the first reflective surface;
wherein the first region and the second reflective surface are configured such that the apparatus provides a first beam path in which light of the first beam path reflects off the first region to the second reflective surface, and reflects off the second reflective surface through the orifice, and
wherein the first region, the second region and the second reflective surface are configured such that the apparatus provides a second beam path in which light of the second beam path reflects off the first region to the second reflective surface, reflects of the second reflective surface onto the second region, reflects off the second region to the second reflective surface, and reflects off the second reflective surface through the orifice.

2. The apparatus of claim 1, wherein primary reflector comprises an annular mirror in which the orifice is at the center of the annular mirror, the second region comprises a first annular region closest to the orifice, and the first region comprises a second annular region surrounding the first annular region.

3. The apparatus of claim 1, wherein first region comprises a first profile and the second region comprises a second profile different from the first profile.

4. The apparatus of claim 1, wherein the first region comprises a first radius of curvature and the second region comprises a second radius of curvature different from the first radius of curvature.

5. The apparatus of claim 1, wherein the first beam path reflects collimated light entering the apparatus such that it initially reflects off of the primary reflector and is reflected off the secondary reflector to a focus point on an opposite side of the primary reflector from the secondary reflector;

wherein the second beam path reflects non-collimated light entering the apparatus such that it initially reflects off of the primary reflector and is reflected off the secondary reflector to the focus point.

6. The apparatus of claim 1, wherein the first beam path reflects collimated light entering the apparatus such that it initially reflects off of the primary reflector and is reflected off the secondary reflector to a first focus point on an opposite side of the primary reflector from the secondary reflector; and wherein the second beam path reflects non-collimated light entering the apparatus such that it initially reflects off of the primary reflector and is reflected off the secondary reflector to a second focus point different from the first focus point on the opposite side of the primary reflector from the secondary reflector.

7. The apparatus of claim 1, wherein the first beam path comprises a first numerical aperture and the second beam path comprises a second numerical aperture different from the first numerical aperture.

8. An apparatus comprising:

a primary reflector comprising a first orifice and a first reflective surface;

a secondary reflector comprising a second reflective surface facing the first reflective surface; and a third reflector comprising a second orifice and a third reflective surface facing the second reflective surface;

wherein the primary reflector, secondary reflector and third reflector are configured such that the apparatus provides a first beam path in which light of the first beam path reflects off the first reflective surface to the second reflective surface and reflects off the second reflective surface through the first orifice and the second orifice, and wherein the primary reflector, the secondary reflector and the third reflector are configured such that the apparatus provides a second beam path in which light of the second beam path reflects off the first reflective surface to the second reflective surface, reflects off the second reflective surface to the third reflective surface, reflects off the third reflective surface to the second reflective surface, and reflects off the second reflective surface through the second orifice and the first orifice.

9. The apparatus of claim 8, wherein primary reflector comprises a first annular mirror in which the first orifice is at the center of the first annular mirror, and the third reflector comprises a second annular mirror in which the second orifice is at the center of the second annular mirror.

10. The apparatus of claim 8, wherein first reflective surface comprises a first profile and the third reflective surface comprises a second profile different from the first profile.

11. The apparatus of claim 8, wherein the first reflective surface comprises a first radius of curvature and the third reflective surface comprises a second radius of curvature different from the first radius of curvature.

12. The apparatus of claim 8, wherein the first beam path reflects collimated light entering the apparatus such that it initially reflects off of the primary reflector and is reflected off the secondary reflector to a focus point on an opposite side of the primary reflector from the secondary reflector; and wherein the second beam path reflects non-collimated light entering the apparatus such that it initially reflects off of the primary reflector and is reflected through the first orifice and the second orifice to the focus point.

13. The apparatus of claim 8, wherein the first beam path reflects collimated light entering the apparatus such that it initially reflects off of the primary reflector and is reflected off the secondary reflector to a first focus point on an opposite side of the primary reflector from the secondary reflector; and Wherein the second beam path reflects non-collimated light entering the apparatus such that it initially reflects off of the primary reflector and is reflected through the first orifice and the second orifice to a second focus point different from the first focus point on the opposite side of the primary reflector from the secondary reflector.

14. The apparatus of claim 8, wherein the third reflector is arranged between the primary reflector and the secondary reflector.

15. An apparatus comprising:

a primary reflector comprising a first orifice and a first reflective surface;

a secondary reflector comprising a second reflective surface facing the first reflective surface;

a third reflector comprising a second orifice and a third reflective surface facing the second reflective surface; and a fourth reflector comprising a fourth reflective surface facing the third reflective surface;

wherein the primary reflector, secondary reflector and third reflector are configured such that the apparatus provides a first beam path in which light of the first beam path reflects off the first reflective surface, to the second reflective surface and reflects off the second reflective surface through the first orifice and the second orifice, and wherein the primary reflector, the secondary reflector, the third reflector and the fourth reflector are configured such that the apparatus provides a second beam path in which light of the second beam path reflects off the first reflective surface to the second reflective surface, reflects off the second reflective surface to the third reflective surface, reflects off the third reflective surface to the fourth reflective surface, and reflects off the fourth reflective surface through the second orifice and the first orifice.

16. The apparatus of claim 15, wherein primary reflector comprises a first annular mirror in which the first orifice is at the center of the first annular mirror, and the third reflector comprises a second annular mirror in which the second orifice is at the center of the second annular mirror.

17. The apparatus of claim 15, wherein first reflective surface comprises a first profile and the third reflective surface comprises a second profile different from the first profile.

18. The apparatus of claim 15, wherein the first reflective surface comprises a first radius of curvature and the third reflective surface comprises a second radius of curvature different from the first radius of curvature.

19. The apparatus of claim 15, wherein the third reflector is arranged between the primary reflector and the secondary reflector.

20. The apparatus of claim 19, wherein the fourth reflector is arranged between the third reflector and the secondary reflector.

* * * * *